United States Patent
Sihn et al.

(10) Patent No.: US 9,158,545 B2
(45) Date of Patent: Oct. 13, 2015

(54) LOOKING AHEAD BYTECODE STREAM TO GENERATE AND UPDATE PREDICTION INFORMATION IN BRANCH TARGET BUFFER FOR BRANCHING FROM THE END OF PRECEDING BYTECODE HANDLER TO THE BEGINNING OF CURRENT BYTECODE HANDLER

(75) Inventors: Kue-Hwan Sihn, Hwaseong-si (KR); Seung-Mo Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 785 days.

(21) Appl. No.: 13/276,083

(22) Filed: Oct. 18, 2011

(65) Prior Publication Data

US 2012/0151194 A1 Jun. 14, 2012

(30) Foreign Application Priority Data

Dec. 9, 2010 (KR) .................. 10-2010-0125688

(51) Int. Cl.
*G06F 9/32* (2006.01)
*G06F 9/38* (2006.01)
*G06F 9/455* (2006.01)

(52) U.S. Cl.
CPC .............. *G06F 9/322* (2013.01); *G06F 9/3806* (2013.01); *G06F 9/45508* (2013.01)

(58) Field of Classification Search
CPC ... G06F 9/3806; G06F 9/3844; G06F 9/3802; G06F 9/3842; G06F 9/3804; G06F 9/45504; G06F 9/45508; G06F 9/4552; G06F 9/3879; G06F 9/45516; G06F 9/455
See application file for complete search history.

(56) References Cited

U.S. PATENT DOCUMENTS 5,909,567 A * 6/1999 Novak et al. .................. 712/208
5,928,358 A 7/1999 Takayama et al.

(Continued)

FOREIGN PATENT DOCUMENTS

CN 1186981 A 7/1998
EP 2-182-433 A1 5/2010

OTHER PUBLICATIONS

Berndl, Marc, et al., "Context Threading: A flexible and efficient dispatch technique for virtual machine interpreters," Proc. of the Int. Symposium of Code Generation and Optimization, 2005, 12 pages.

(Continued)

*Primary Examiner* — Kenneth Kim
(74) *Attorney, Agent, or Firm* — NSIP Law

(57) ABSTRACT

A bytecode interpreter is provided. The interpreter assists in branch prediction by a host processor reducing branch misprediction and achieving high performance. The bytecode branch processor includes an interpreter configured to process a program in a bytecode format in a virtual machine, a branch information generator configured to obtain, while a predefined number of bytecodes are read prior to a current bytecode being processed by the interpreter, a branch address and a target address of a predicted path of a branch corresponding to a preceding bytecode, the branch address being of a branch code included in a preceding handler that processes the preceding bytecode, and the target address being of a current handler that processes the current bytecode to which the preceding handler branches, and a branch target buffer updater configured to update a branch target buffer in the bytecode branch processor with the obtained branch address and target address.

11 Claims, 5 Drawing Sheets

(56) References Cited

U.S. PATENT DOCUMENTS

| | | | |
|---|---|---|---|
| 6,088,793 A * | 7/2000 | Liu et al. ................. | 712/239 |
| 6,192,468 B1 * | 2/2001 | Mahalingaiah et al. ...... | 712/231 |
| 2006/0236080 A1 | 10/2006 | Doing et al. | |

OTHER PUBLICATIONS

Bornstein, Dan, "Presentation of Dalvik VM Internals," Google I/O, 2008, 58 pages.

Ertl, M. Anton, et al., "The structure and performance of efficient interpreters," Journal of Instruction-Level Parallelism, 2003, 25 pages, vol. 5.

Lindholm, Tim, et al., "Chapter 6: The Java Virtual Machine Instruction Set" and "Chapter 9: Opcode Mnemonics by Opcode," The Java Virtual Machine Specification, 13 pages, 1999, second edition.

European Extended Search Report issued Dec. 5, 2012 in counterpart European Patent Application No. 11192498.1-2211/2463776 (9 pages, in English).

Li, Tao et al. "Adapting Branch-Target Buffer to Improve the Target Predictability of Java Code," ACM Transactions on Architecture and Code Optimization, vol. 2, No. 2, Jun. 2005, pp. 109-130 (22 pages, in English).

Chinese Office Action issed on Apr. 29, 2015 in counterpart Patent Application No. 201110220091.6 (6 pages, with English translation).

* cited by examiner

FIG. 2A

| opcode | Bytecode length | Branch Addr |
|---|---|---|
| 0 (=move) | 2 | BASE+0*64+28 |
| 1 | 6 | BASE+1*64+36 |
| 2 | 4 | BASE+2*64+32 |
| 3 (=if-ge) | 2 | BASE+3*64+48 |

LOOKING AHEAD BYTECODE STREAM TO GENERATE AND UPDATE PREDICTION INFORMATION IN BRANCH TARGET BUFFER FOR BRANCHING FROM THE END OF PRECEDING BYTECODE HANDLER TO THE BEGINNING OF CURRENT BYTECODE HANDLER

CROSS-REFERENCE TO RELATED APPLICATION(S)

This application claims the benefit under 35 U.S.C. §119 (a) of Korean Patent Application No. 10-2010-0125688, filed on Dec. 9, 2010, in the Korean Intellectual Property Office, the entire disclosure of which is incorporated herein by reference for all purposes.

BACKGROUND

1. Field

The following description relates to a bytecode interpreter in a computing system, and more particularly, to a branch processor and method that are capable of increasing the performance of a bytecode interpreter by reducing a branch misprediction and a pipeline stall penalty which may occur in a bytecode interpreter that drives a virtual machine.

2. Description of the Related Art

Numerous studies have been conducted in an effort to increase the performance of a virtual machine that processes JAVA® bytecode. The performance of a virtual machine may be enhanced by a Just-in-time compilation (JITC).

However, an embedded system has a difficulty in actively introducing JITC because of resource limitation and latency which is sensitive to a user of the device. As a result, an embedded system typically utilizes JITC in a limited manner. In addition, because not all of the code of an application program is complied in JITC format, the performance of an interpreter is critically important.

A direct-thread method is an alternative method for improving the performance of the interpreter. In this method, a next virtual instruction is fetched at an end of a bytecode handler. This method has been recently employed for an ANDROID® DALVIK® virtual machine. Another alternative method is an ARM JAZELLE® DBX (Direct Bytecode eXecution) that processes bytecode entirely in hardware.

The direct-thread method has disadvantages in that an indirect branch instruction may confuse a branch predictor of a real processor (e.g., x86 or ARM), resulting in an increased amount of branch misprediction and a deterioration in performance.

For a processor with a general pipeline structure, if branch misprediction occurs, all of the instructions which have been speculatively executed are discarded, and the processor returns to a state at which the branch started. For example, if a high-end superscalar processor such as an ARM CORTEX® A9 is introduced in an embedded device, performance deterioration due to branch misprediction may increase.

An indirect branch instruction used in the direct-thread method jumps to an address of a different handler based on a next virtual instruction in the same program counter (PC), and thus a general branch predictor based on a PC may not work properly. To solve such a drawback, various methods including selective inlining and context threading have been introduced, but disadvantages arise in that a code size increases and overhead of call/return occurs.

In addition, hardware implementation such as JAZELLE® DBX has high performance but requires a large amount of hardware resources, and cannot handle a new type of bytecode such as DALVIK®.

SUMMARY

In one general aspect, there is provided a bytecode branch processor in a computing system, the bytecode branch processor including an interpreter configured to process a program in bytecode format in a virtual machine, a branch information generator configured to obtain, in advance, branch information from a predicted path for a branch that is included in a bytecode preceding a bytecode that is currently being processed by the interpreter, and a branch target buffer (BTB) updater configured to update a branch target buffer (BTB) in the computing system based on the obtained branch information.

The interpreter may be further configured to run a program in the format of bytecode that has a variable length.

The interpreter may be further configured to process bytecode using a handler that has a callable opcode for running the program.

The handler may comprise code information for jumping to an opcode that processes the bytecode according to the order of bytecode processing.

The branch information generator may be further configured to include a table that comprises the opcode, a length of the bytecode, and an address of branch code that are mapped according to the order of bytecode processing.

The branch information generator may be further configured to generate branch information from the table by mapping a branch address corresponding to an address of a bytecode which precedes the bytecode that is currently being processed by the interpreter and a target address corresponding to an address of the branch code in the handler that has the opcode which processes the preceding bytecode.

The branch information generator may be further configured to generate the branch address by adding a length of the preceding bytecode that is obtained from the table to the bytecode that is currently being processed by the interpreter, and to generate the target address based on the branch code in the handler that has the opcode which processes the preceding bytecode, wherein the branch code is obtained from the table.

The BTB and the BTB updater may be configured to run on different cores, and branch information stored in the BTB may be updatable through the BTB updater.

The bytecode branch processor may further comprise a branch predictor configured to predict a path of a conditional branch included in the bytecode.

In another aspect, there is provided a method of processing a bytecode branch in a computing system, the method including, in response to a predicted path of a branch being present in a bytecode processed by a virtual machine, updating the path using a branch predictor of the computing system, in response to the branch predictor predicting that a bytecode preceding the bytecode currently being processed by the virtual machine is a branch, determining whether or not the preceding bytecode is a conditional branch, in response to determining that the preceding bytecode is not a conditional branch, searching a table to which an opcode that processes the preceding bytecode and a branch address are mapped, obtaining branch information generated by mapping a branch address corresponding to an address of the preceding bytecode and a target address corresponding to an address of branch code in a handler that has the opcode which processes the preceding bytecode, and updating a branch target buffer (BTB) of the computing system based on the obtained branch information.

The table to which the opcode, a length of the bytecode, and an address of the branch code in the handler that has the opcode are mapped, may be previously stored in the computing system.

The obtaining of the branch information may comprise generating the branch address by adding a length of the preceding bytecode that is obtained from the table to the bytecode that is currently being processed by the virtual machine, and generating the target address based on the branch code in the handler that has the opcode which processes the preceding bytecode, wherein the branch code is obtained from the table.

The method may further comprise, in response to determining that the preceding bytecode is a conditional branch, predicting a path of a conditional branch that is present in the bytecode, and searching a table to which an opcode retained by the computing system and a branch address are mapped, based on an opcode corresponding to the predicted path.

If the computing system is a multi-core system, a core in which the BTB is running may be allocated to a different core from a core that updates the BTB.

In another aspect, there is provided a branch prediction method for a multi-core processor, the method including generating a virtual program counter (vPC) value indicating a current bytecode for processing, processing the current bytecode with a bytecode interpreter, generating a pre-load vPC value indicating bytecode that precedes the bytecode that is currently being processed, predicting branch information in advance for bytecode that precedes the bytecode currently being executed, before the vPC reaches a value of the pre-load vPC, and updating a branch target buffer (BTB) with the predicted branch information for the bytecode that precedes the bytecode currently being executed.

The processing of the current bytecode may be performed on a first core of the multi-core processor, and the predicting branch information for the bytecode that precedes the bytecode currently being executed may be performed on a second core of the multi-core processor.

The first core and the second core may simultaneously process the current bytecode and predict branch information for the bytecode that precedes the bytecode currently being executed, respectively.

Other features and aspects may be apparent from the following detailed description, the drawings, and the claims.

BRIEF DESCRIPTION OF THE DRAWINGS

FIGS. 2A and 2B are diagrams illustrating examples of an opcode-branch address table and a programmable BTB structure.

Figure 1:
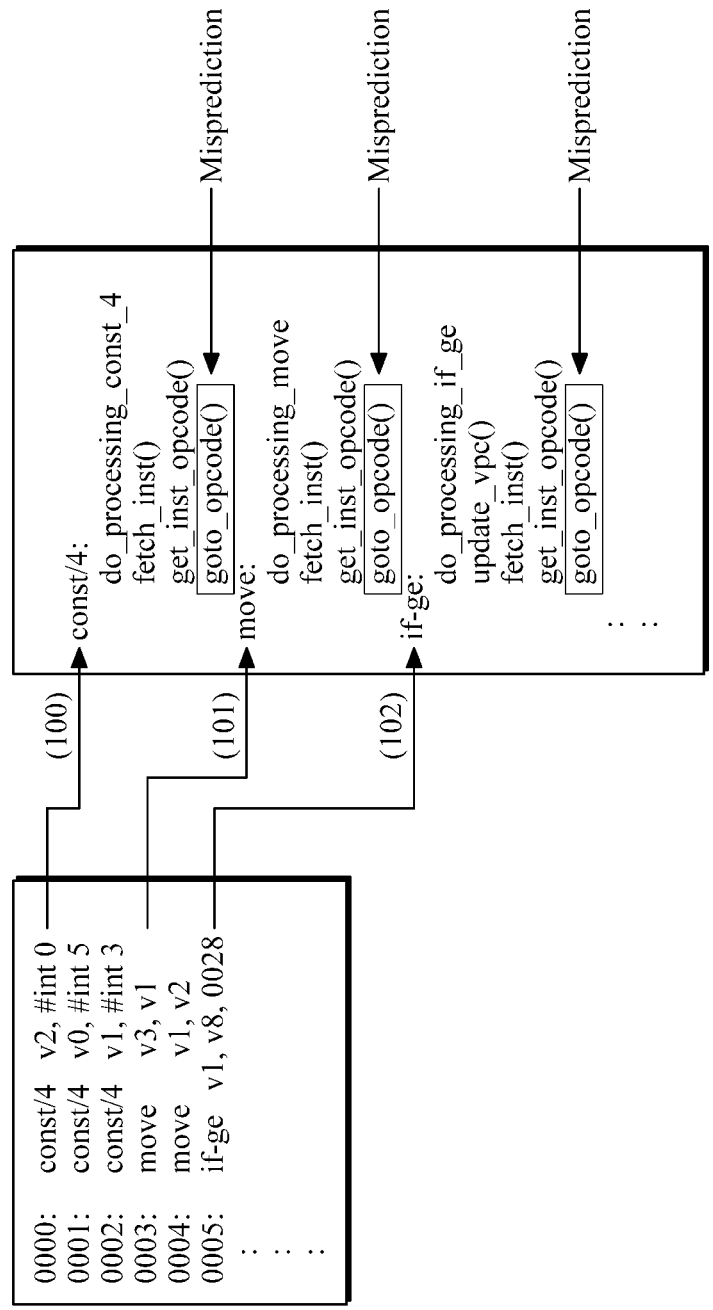
FIG. 1 is a diagram illustrating an example of a virtual machine bytecode and a direct-thread handler.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

The processing and handling components described herein may be or may be included in a terminal, such as a mobile terminal, a computer, a smart phone, a MP3 player, and the like.

FIG. 1 illustrates an example of a virtual machine bytecode and a direct-thread handler.

Referring to FIG. 1, the handler shown in the example may be used to process a branch in favor of a processor. The handler may be implemented as an interpreter in a virtual machine such as a JAVA® or ANDROID® DALVIK® virtual machine.

In the example illustrated in FIG. 1, a DALVIK® bytecode with a variable length is provided. A bytecode with a fixed length such as JAVA® may be applied, but because the process of variable length may be more complicated, a variable-length-bytecode, DALVIK®, is taken as an example. The example illustrated in FIG. 1 illustrates an interpreter which process the bytecode in an assembly level using a direct-thread method.

The interpreter includes a bytecode handler that has a fixed maximum length (in the example, the maximum length is 64 bytes). If the size of the handler with a fixed length is insufficient to process functions, the handler may jump to an additional processing routine at a different location, and may process the remaining functions.

The handler that processes the bytecode in an assembly level using a direct-thread method may utilize a standard branch prediction mechanism. In this example, the branch prediction mechanism includes a branch target buffer and a branch predictor. It should also be appreciated that a different type of branch prediction mechanism may be applied.

The example illustrated in FIG. 1 may more efficiently processes a branch prediction of a general hardware system by interaction between a program counter (PC) of an actual system and a virtual PC (vPC) of a bytecode.

Before an adjustment an interpreter processes bytecodes with a handler. In this example, the bytecodes are provided in the order of "const/4 vA," "move vA," and "if-ge vA." First, a handler for "const/4" is called (100), a virtual PC is increased in the handler, and it is detected that a next bytecode is "move vA." In this example, the interpreter jumps to move process routine (GOTO_OPCODE).

A handler for "move" is called (101), and subsequently, the interpreter moves to an 'if-ge' processing routine, and a handler for "if-ge" is called (102). A processor in which a general interpreter operates may have a number of branch mispredictions because the processor determines a target address only with a PC of GOTO_OPCODE.

The interpreter shown in the example illustrated in FIG. 1 may load in advance an accurate target address in a branch target buffer (BTB) during a BTB fill-in operation. Then, an actual hardware predictor may perform accurate branch prediction with reference to the accurate target address at a corresponding time.

BTB fill-in may be processed in a software and/or hardware manner. In processing in software manner, if a multi-core is provided, latency may be reduced by using a different processor. For example, in a BTB fill-in thread (or function), a separate virtual PC value is maintained, which is referred to as preload-vPC. The preload-vPC indicates a bytecode that precedes the currently processed vPC, wherein branch information of the indicated bytecode is reflected in hardware. If a vPC value is close to preload-vPC, the BTB fill-in operation may acquire additional branch information.

Figure 2B:
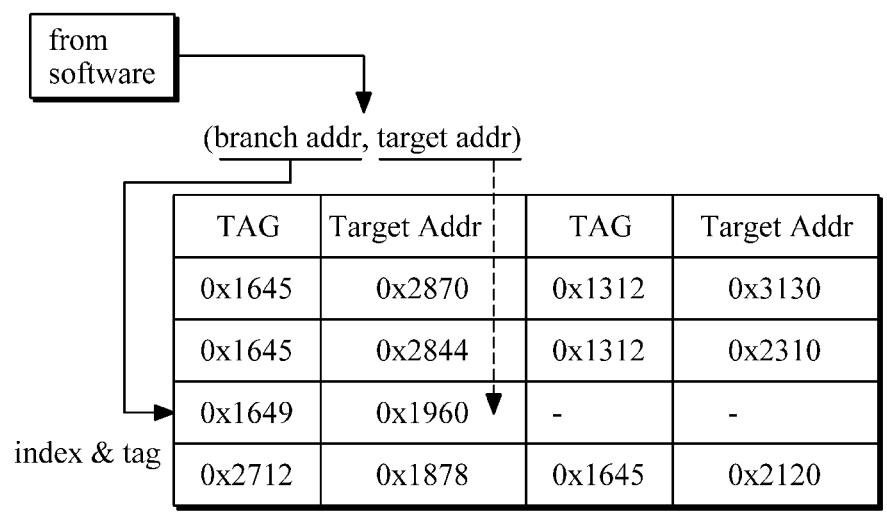

FIGS. 2A and 2B illustrate examples of an opcode-branch address table and a programmable BTB structure.

In building an interpreter for the BTB fill-in operation, an opcode-branch address table may be made in advance. Referring to FIG. 2, the table shows an actual location of a branch in each opcode handler.

If a handler starting location of "move" code is 01×64 (byte), an address of GOTO_OPCODE( )in a move handler for jumping to a next actual instruction may be written in a "branch address" column of the table. In addition, to process a variable byte code such as DALVIK®, a length of each opcode may be written in a "bytecode length" column.

In the BTB fill-in operation, a predefined number of bytecodes are read sequentially in advance starting from a current vPC or a previously scanned vPC location, and the table is searched for each read bytecode. Because the BTB fill-in operation precedes an actual vPC, it is referred to as "pre-vPC." To read a bytecode subsequent to a pre-vPC, "bytecode length" may be read.

Then, a next bytecode address becomes pre-vPC+current bytecode length. By reading a "branch address" column of the table, an address for the corresponding bytecode handler to branch to may be obtained. Branch information for a BTB may consist of a pair of addresses such as [branch address, target address].

For example, branch information for vPC+(1st bytecode) is [branch address (vPC+(1st bytecode)), handler location (vPC+(2nd bytecode))]. By performing the BTB fill-in operation k times, k pieces of branch information are generated.

To reflect the branch information, a hardware branch predictor may allow the update of branch information. In the case of a software BTB fill-in operation, the branch information may be mapped to a specific I/O address or memory space in order to update the BTB record in software. The above described BTB is referred to as a "programmable BTB."

The BTB shown in the example illustrated in FIG. 2B is similar to a general BTB structure, however, an entry may be updated to software or separate hardware.

Figure 3:
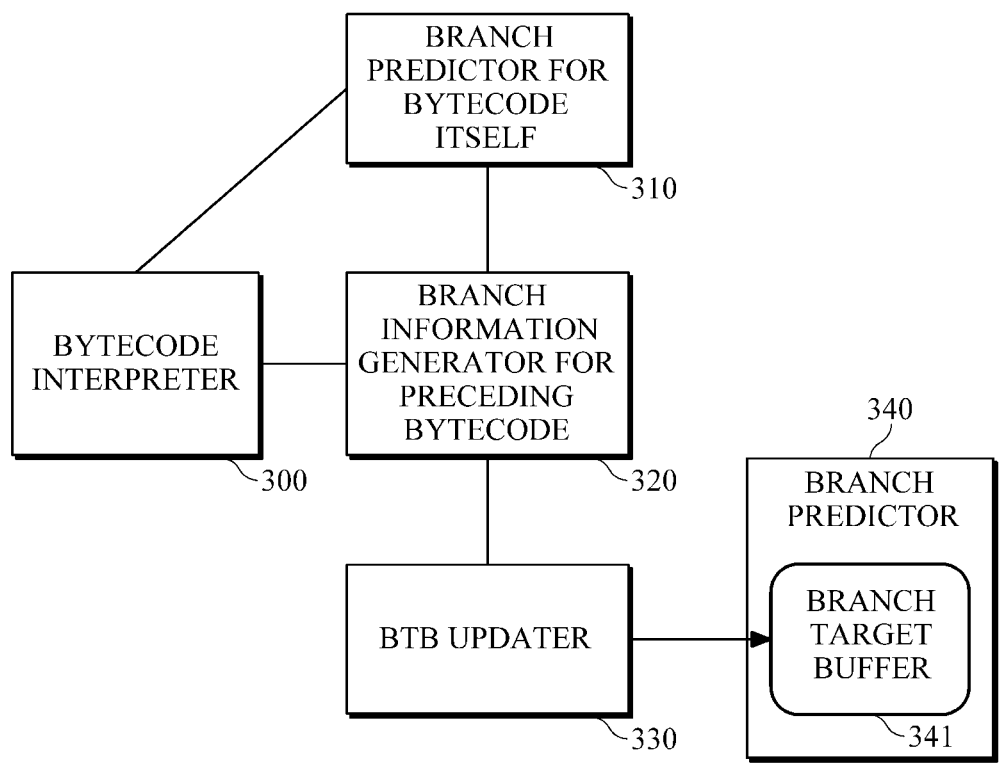
FIG. 3 is a diagram illustrating an example of a bytecode branch processor.

FIG. 3 illustrates an example of a bytecode branch processor.

Referring to FIG. 3, the branch processor includes a bytecode interpreter 300, branch predictors 310 and 340, a branch information generator 320, and a BTB updater 330.

The bytecode interpreter 300 may run a program in bytecode format in a virtual machine. For example, the bytecode interpreter 300 may run a program in the format of bytecode with a variable length. To run the program, a bytecode may be processed using a handler that has a callable opcode. The handler may include location information of a code to jump to an opcode that processes a bytecode based on the order of the bytecode processing.

The branch predictor 310 may predict a path of a conditional branch that is present in the bytecode.

The branch information generator 320 may obtain branch information in advance from the predicted path of a branch prior to a bytecode being processed by the bytecode interpreter 300. For example, the branch information generator 320 may include a table to which opcode, bytecode length, and an address of branch code in the opcode are mapped according to the order of bytecode processing. The branch information generator 320 may calculate an address of the next bytecode by adding the currently processed bytecode and a length of a preceding bytecode that are obtained from the table, and may generate pairs of a branch address and a target address.

The BTB updater 330 may update a branch target buffer (BTB) 341 of a computing system with the generated branch information.

Figure 4:
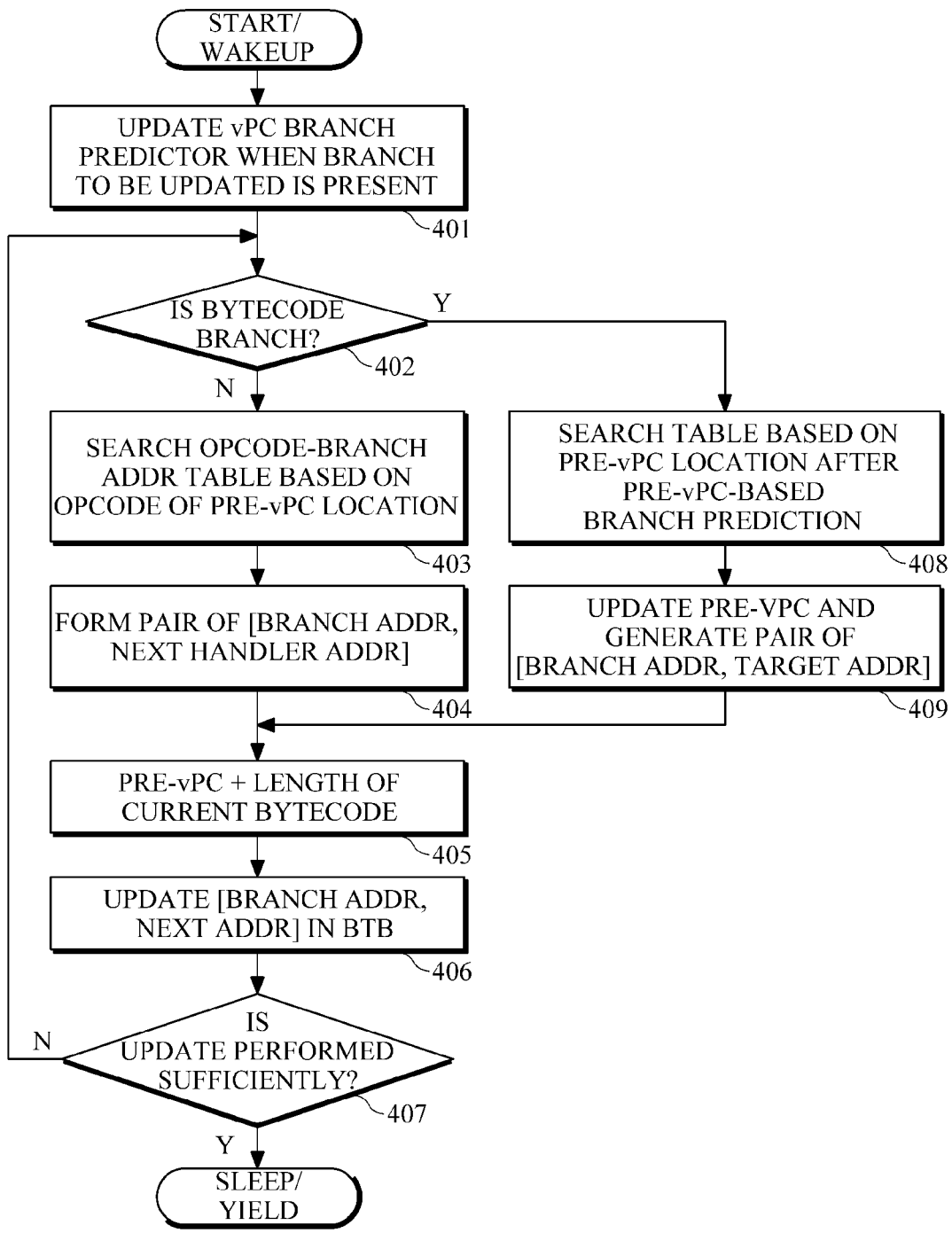
FIG. 4 is a flowchart illustrating an example of a method of processing a bytecode branch.

FIG. 4 illustrates an example of a method of processing a bytecode branch.

A BTB fill-in mechanism may have an individual branch prediction mechanism for a vPC itself. The branch prediction mechanism may be implemented in software and/or hardware. Hardware implementation may be performed using the same software logic, and thus the logic will be described as software. In the BTB fill-in mechanism, the fill-in is performed until an initial branch is encountered, and the fill-in is stopped when branch prediction is not present at the time of encountering a branch.

Fill-in is stopped when a predetermined number of branches have been passed through, for example, one branch, two branches, or more. In response to updating a branch result queue, a branch predictor is updated. In the case of a branch misprediction, a vPC pointer which has been performed for a preceding BTB fill-in operation returns to a branch misprediction point, and BTB fill-in proceeds from the branch misprediction point.

Referring to FIG. 4, in response to a branch being found in the branch result queue, the branch predictor is updated, in 401, and the BTB fill-in operation for the next bytecode is performed. For example, the BTB fill-in may be executed by a function call in a single processor, may be implemented as different threads in a multi-core processor, may be implemented as hardware logic, and the like.

Whether the bytecode is a branch in the branch result queue is determined, in 402.

If the bytecode is not a branch, in 403 an opcode-branch address table is searched using an opcode at a pre-vPC location. For example, by reading a "branch address" column of the table, an address to which the bytecode handler actually branches may be obtained. Based on the obtained address, a pair of [Branch Addr, Handler Addr] is generated, in 404.

To read a bytecode subsequent to pre-vPC, a bytecode length is read. An address of the next bytecode is pre-vPC+(length of current bytecode) is read, in 405.

Branch information to be included in the BTV is generated as a pair of addresses [branch address, target address], in 406. To reflect the generated branch information, the hardware branch predictor may allow a branch information update. In response to the hardware branch predictor allowing the branch information update, the branch information is updated in the BTB, in 406. In this example, in BTB fill-in operation, if the vPC encounters an unconditional branch, a conditional branch, an invoke-direct, or an invoke-virtual, a software-implemented BTB for the vPC may be looped up. As an example, the BTB may be implemented as a 2-way set associative BTB.

Conversely, if a BTB is a hit and a branch is a conditional branch in 402, a general branch predictor such as gShare may be applied, in 408.

As a result, even in the case of a fall-through or a taken, a target address may be obtained. Accordingly, it is possible to obtain the pair of addresses as described above. However, in the vPC branch prediction implementation, a check may be performed as to whether the pair of addresses is appropriate in an actual branch of a bytecode, in 409. An update of an actual branch address in a bytecode handler of an interpreter may be performed.

To prevent collision with the operation of the vPC predictor (mostly, threads the same as BTB fill-in threads), a shared original queue may be provided such that an interpreter functions as a producer and vPC branch prediction functions as a consumer. For example, the interpreter may insert a pair of [vPC, target address] in the shared queue when the branch is resolved, and the vPC branch prediction may validate the predicted branch by checking the shared queue, and may update the branch information. This is the same as update logic of traditional hardware branch prediction.

As such, by iteratively updating the branch information in BTB, in 406, branch prediction of a bytecode which precedes the currently processed bytecode is made and the update of BTB completes, in 407. Subsequently, the branch prediction enters sleep/yield state, and if branch prediction result for the preceding bytecode is not sufficient as the bytecode is executed, operations from 402 are performed again.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A bytecode branch processor, the bytecode branch processor comprising:
   an interpreter configured to process a program in a bytecode format in a virtual machine;
   a branch information generator configured to obtain, while a predefined number of bytecodes are read prior to a current bytecode being processed by the interpreter, a branch address and a target address of a predicted path of a branch corresponding to a preceding bytecode preceding the current bytecode by using a table that comprises a preceding opcode, a length of the preceding bytecode, and the branch address, which are mapped according to the order of bytecode processing, the branch address being of a branch code included in a preceding handler that processes the preceding bytecode, and the target address being of a current handler that processes the current bytecode to which the preceding handler branches; and
   a branch target buffer (BTB) updater configured to update a branch target buffer (BTB) in the bytecode branch processor with the obtained branch address and target address,
   wherein the interpreter is further configured to process a branch prediction and to remove a branch misprediction by checking whether the obtained branch address and target address in the BTB is validated in the branch prediction of the current bytecode.

2. The bytecode branch processor of claim 1, wherein the interpreter is further configured to run a program in the format of bytecode that has a variable length.

3. The bytecode branch processor of claim 1, wherein the interpreter is further configured to process the preceding bytecode using the preceding handler that has a preceding opcode, to run the program.

4. The bytecode branch processor of claim 3, wherein the branch code is used to jump to the current handler that has a current opcode, according to an order of bytecode processing.

5. The bytecode branch processor of claim 4, wherein the branch information generator is configured to:
   obtain, from the table, the branch address; and
   obtain the target address based on the branch code.

6. The bytecode branch processor of claim 5, wherein the branch information generator is configured to obtain an address of the current bytecode by adding the length of the preceding bytecode that is obtained from the table to a virtual program counter of the preceding bytecode.

7. The bytecode branch processor of claim 1, wherein:
   the BTB and the BTB updater are configured to run on different cores; and the BTB updater is further configured to update the branch address and target address that are stored in the BTB.

8. The bytecode branch processor of claim 1, further comprising:
a branch predictor configured to predict a path of a conditional branch corresponding to the current bytecode.

9. A branch prediction method in a multi-core processor, the method comprising:
generating a virtual program counter (vPC) value indicating a current bytecode to be processed;
generating a pre-load vPC value indicating a preceding bytecode prior to the current bytecode at vPC value;
predicting a branch address and a target address of the preceding bytecode at pre-load vPC value using a table that comprises a preceding opcode, a length of the preceding bytecode, and the branch address, which are mapped according to the order of bytecode processing, the branch address being of a branch code included in a preceding handler that processes the preceding bytecode, and the target address being of a current handler that processes the current bytecode to which the preceding handler branches;
updating a branch target buffer (BTB) with the predicted branch address and target address;
processing the current bytecode with a branch prediction by a bytecode interpreter; and
removing a branch misprediction by checking whether the obtained branch address and target address in the BTB is validated in the branch prediction of the current bytecode.

10. The method of claim 9, wherein:
the processing of the current bytecode is performed on a first core of the multi-core processor; and
the predicting of the branch address and target address is performed on a second core of the multi-core processor.

11. The method of claim 10, wherein the processing of the current bytecode and the predicting of the branch of the branch address and target address are simultaneously performed on the first core and second core, respectively.

* * * * *